US008595441B1

(12) United States Patent
Nakibly et al.

(10) Patent No.: US 8,595,441 B1
(45) Date of Patent: Nov. 26, 2013

(54) CACHE OPERATIONS USING TRANSFORMED INDEXES

(75) Inventors: Guy Nakibly, Haifa (IL); Adi Habusha, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 295 days.

(21) Appl. No.: 12/983,775

(22) Filed: Jan. 3, 2011

Related U.S. Application Data

(60) Provisional application No. 61/292,128, filed on Jan. 4, 2010, provisional application No. 61/331,538, filed on May 5, 2010.

(51) Int. Cl.
G06F 12/00 (2006.01)
(52) U.S. Cl.
USPC .......................................... 711/130
(58) Field of Classification Search
None
See application file for complete search history.

(56) References Cited

U.S. PATENT DOCUMENTS

| | | | | |
|---|---|---|---|---|
| 7,290,116 B1 * | 10/2007 | Grohoski et al. | | 711/216 |
| 8,266,409 B2 * | 9/2012 | Koob et al. | | 711/212 |
| 2008/0086620 A1 * | 4/2008 | Morris | | 711/203 |

* cited by examiner

Primary Examiner — Hiep Nguyen

(57) ABSTRACT

Some of the embodiments of the present disclosure provide apparatuses, systems, and methods for reducing the likelihood of cache line overlaps in a multi-processor system having a shared memory cache. A transformation function module coupled to the shared memory cache is configured to transform an index associated with a cache operation associated with a processor of the plurality of processors using a transformation function to generate a transformed index. In embodiments, groups of one or more processors have different or unique transformation functions associated with them in order to decrease the tendency or likelihood of their respective cache lines in the shared memory cache to overlap. Other embodiments are also described and claimed.

20 Claims, 5 Drawing Sheets

CACHE OPERATIONS USING TRANSFORMED INDEXES

CROSS REFERENCE TO RELATED APPLICATIONS

The present application claims priority to U.S. Provisional Application No. 61/331,538, filed May 5, 2010, and U.S. Provisional Application No. 61/292,128, filed Jan. 4, 2010. The entire specifications of both of these Provisional Applications are hereby incorporated by reference in their entirety for all purposes, except for those sections, if any, that are inconsistent with this specification.

TECHNICAL FIELD

The present disclosure relates to system level cache memory, and in particular to schemes to perform cache operations using transformed indexes.

BACKGROUND

The background description provided herein is for the purpose of generally presenting the context of the disclosure. Work of the presently named inventors, to the extent it is described in this background section, as well as aspects of the description that do not otherwise qualify as prior art at the time of filing, are neither expressly nor impliedly admitted as prior art against the present disclosure.

Processor memory transactions are frequently characterized in locality, meaning that most reads and writes by a single processor to a main memory during a certain time frame are to memory locations that are clustered together within the main memory space. Because physical memory addresses are contiguous, processor transactions that are characterized in locality will result in a large number of memory transactions to memory addresses that are numerically close together, or clustered within a certain range of contiguous memory addresses (although the actual memory addresses of the individual memory transactions are not themselves necessarily contiguous, although they may be). Because memory data are allocated to cache lines (such as in system level cache) in which the cache lines have indexes that match the least significant bits of the memory addresses, data from memory transactions that are characterized in locality will tend to be allocated to cache lines that are also clustered together in cache lines within a range of contiguous indexes (although the actual indexes of the cache lines are not themselves necessarily contiguous, although they may be). An Asymmetric Multi-Processor (AMP) system is a multi-processor core system with a shared system level memory cache (such as an SL2 cache). In conventional AMP systems, needs of the different processor cores are accommodated by rigidly or flexibly partitioning the space in the system level cache.

SUMMARY

Some embodiments of the present disclosure provide apparatuses for reducing the likelihood of cache line overlaps in a multi-processor system having a shared memory cache. An apparatus according to embodiments includes a memory cache configured to be shared by the plurality of processors. It also includes a transformation function module coupled to the memory cache which is configured to transform an index associated with a cache operation associated with a processor of a plurality of processors. The transformation function is associated with the processor and generates a transformed index.

Some embodiments of the present disclosure also provide a system for reducing the likelihood of cache line overlaps in a multi-processor system having a shared memory cache comprising a plurality of processors. Systems according to embodiments include a plurality of processors and a memory cache comprising a plurality of cache lines. Systems also include transformation logic coupled to the plurality of processors and the memory cache. The transformation logic is configured to transform individual ones of indexes associated with cache operations using processor-specific transformation functions that are unique to respective ones of the plurality of processors. The processor-specific transformation functions tend to cause overlapping ranges of indexes associated with memory transactions of the different processors to be allocated to cache lines in the memory cache that are spread throughout the memory cache.

Some embodiments of the present disclosure also provide a method for reducing the likelihood of cache line overlaps in a multi-processor system having a shared memory cache. The method includes associating a cache operation with an indicator that the cache operation is associated with a shared portion of main memory, transforming an index associated with the cache operation using a transformation function associated with shared memory, and performing the cache operation on a cache line associated with the transformed index. The cache operation includes storing the indicator in the cache line.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is noted that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

Figure 1:
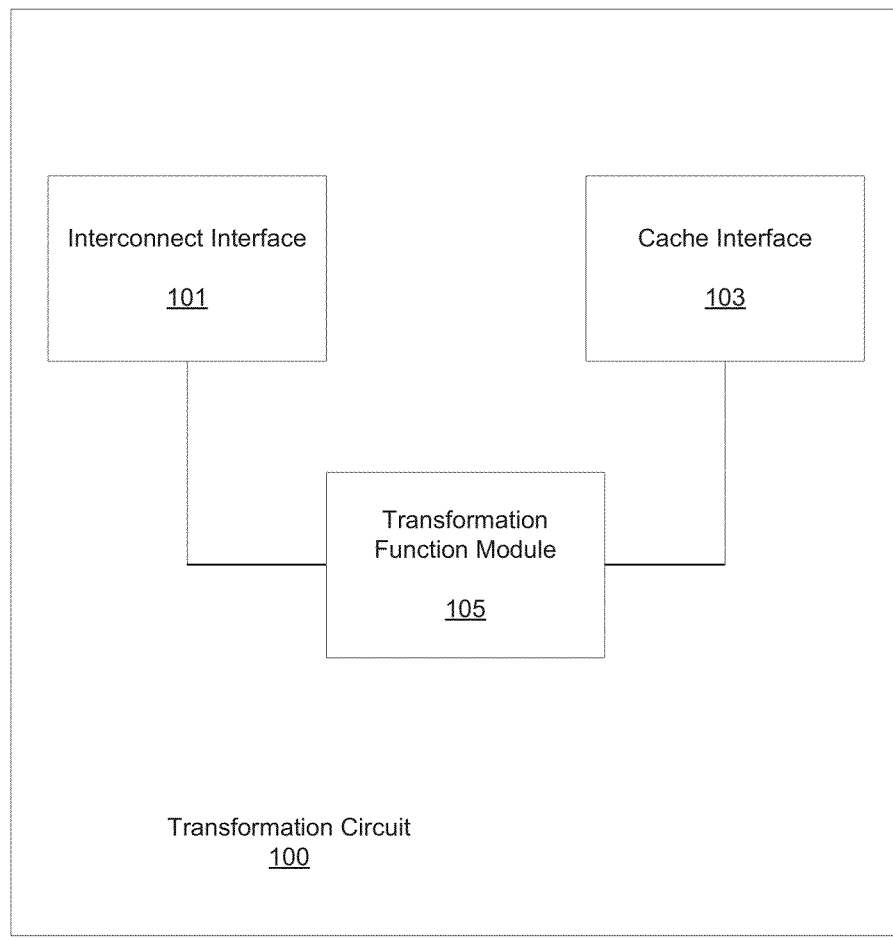
FIG. 1 schematically illustrates a block diagram of a transformation logic module having a transformation function module according to embodiments of the present disclosure.

As used herein, the term "module" refers to a component that is a part of, or includes, an Application Specific Integrated Circuit (ASIC), an electronic circuit, a processor (shared, dedicated, or group) and/or memory (shared, dedicated, or group) that executes one or more software or firmware programs, a combinatorial or sequential logic circuit, and/or other suitable components that provide the described functionality.

Embodiments of the present disclosure include one or more processors, a main memory, and a system level cache that is shared by the one or more processors. The system level cache stores portions of data from a computer system's main memory and provides relatively quick access to previously accessed portions of main memory data. The system level cache stores each datum in a cache line along with a tag that identifies the memory address associated with the datum. In embodiments of the present disclosure, the memory address is the physical memory address that identifies the physical location in the main memory where the datum is stored.

Cache lines in system level cache memories according to embodiments are identified by indexes. When a datum is stored in a conventional memory cache, it is stored in a cache line having an index that matches a portion of the memory address (such as the least significant bits) where the datum is stored in main memory. Embodiments of the present disclosure store data in cache lines having indexes that match transformed indexes. Such indexes are originally taken from the lowest significant bits of the memory address before they are transformed.

In an Asymmetric Multi-Processor (AMP) system (a computing system that has several processors), it is useful to share a system level memory cache (such as an SL2 cache), to accommodate the varying memory cache requirements of the various processors in the AMP system. But where, as is often the case, processor memory transactions in an AMP system are characterized in locality (memory transactions that tend to be addressed to contiguous memory space within non-shared main memory), sharing the system level cache (without partitioning it for each processor) creates the potential for conflict misses between processors. Conflict misses occur when a processor attempts a look-up operation or some other cache operation to a specific cache line that has been previously allocated to a different processor.

Physical memory addresses uniquely identify physical locations in the main memory; in other words no two locations within a main memory have the same memory address. But because indexes are taken from only a portion of the memory address, different memory addresses may result in the same index, thus creating the potential for conflict misses in an AMP system with shared system level cache. Conflict misses result in slower system performance. More specifically, the potential for conflict misses in a conventional AMP system with shared memory cache is due to the possibility that two or more processors in the AMP system—whose memory transactions tend to be characterized in locality—will address different non-shared memory portions that result in cache entries clustered within index ranges that are contiguous (because the memory transactions are characterized in locality) and that overlapping (which happens due to chance). Overlapping contiguous indexes ranges will result in a high probability of conflict misses.

When data is stored in the system level cache, it is "allocated" as a cache entry to a particular cache line of the system level cache. Allocating a cache entry to a cache line in a shared memory cache, such as SL2 cache, includes storing data from the main memory in a cache line. In embodiments of the present disclosure, the index that is used to allocate a cache line is a transformed index. A transformation function is used to generate the transformed index. A transformation function takes as input the original index (taken from a portion of a physical memory address of the main memory) and converts it into a new, or transformed, index that is different from the original index. The transformation function that is used on a particular index is selected based on the processor in the computing system that initiated the memory transaction (or, in some embodiments, based on whether the memory transaction is for shared or non-shared portions of the main memory). In embodiments, a unique transformation function is associated with each processor. When a cache line is allocated in the system level cache according to embodiments, it is allocated according to the transformed index, rather than according to the original index as in conventional cache memories. Allocating cache entries according to transformed indexes can be thought of as "coloring" the cache.

In addition to line allocation operations, look-up operations and maintenance operations are also performed according to the transformed index. During a look-up operation, a memory transaction results in a look-up to the system cache to determine whether the datum that the processor is attempting to access is stored in the cache. When it is determined that the datum is stored in the cache—because it has been previously allocated to the cache—the result is a cache hit. When the datum is not stored in the cache—because it has not been previously allocated to the cache—the result is a cache miss. A maintenance operation occurs when the datum or other information stored in a cache entry is modified in some way during a memory transaction. As stated above, look-up and maintenance operations are performed according to transformed indexes. As part of this operation, a compare is performed on the processor identifier that accompanies the cache operation data to determine which transformation function is to be used.

When a cache entry is allocated to a cache line, it may also result in an eviction of a previously allocated cache entry. For example, a first processor allocates a cache entry to a cache line. Then, a second processor allocates a different cache entry to the same cache line. This happens because the transformed index of the first cache entry matches the transformed index of the second cache entry. When the second cache entry is allocated to the cache line, the first cache entry is evicted. When a cache line is evicted, the transformed index of the cache line is "de-colored" by an inverse of the transformation function associated with the processor that had previously allocated the cache entry being evicted. The cache line is then evicted using the "de-colored" original index.

Allowing processors within a computing system (such as an AMP system) to share all portions of the system level cache would tend to improve the utilization of the cache versus rigidly or flexibly allocating portions of the cache to each processor. If cache entries for processors in such a computing system are allocated according to non-transformed indexes, cache entries for processors whose memory transactions are characterized in locality would tend to be allocated within a localized area of the cache. But index transformations according to embodiments of the present disclosure tend to distribute such cache entries throughout the cache, such as in a manner that scatters cache entries for a particular processor throughout different portions of the cache, even when the memory transactions are characterized in locality. And using different transformation functions for different processors of the computing system (such as different bijective functions as are described below) tends to result in transformed indexes that will be different from one another, even where the original indexes for those cache entries were the same.

Thus, where two cache entries associated with two different processors would tend to overlap (e.g., cache entries from different processors would tend to be allocated to the same cache lines) using non-transformed indexes, transforming the indexes using different transformation functions, tends to result in non-overlapping cache entries. As stated above, transformation functions tend to spread cache entries for a particular processor throughout the cache in a dispersed manner. Using different transformation functions for different processors in the system tends to spread overlapping cache entries from each processor to different areas of the cache. Therefore, using different transformation functions for different processors increases the likelihood that cache entries for those different processors will be allocated to non-overlapping areas of the cache. And because overlapping cache entries tend to result in line evictions that reduce system performance, using different transformation functions that tend to result in non-overlapping cache entries will tend to reduce the occurrence of line evictions and improve system performance. It is noted that in some instances indexes that start out different from one another and that are transformed using different transformation functions will result in overlapping transformed indexes (and thus cause potential line evictions). Thus, using transformation functions for each processor in accordance with embodiments will not eliminate all instances of overlapping indexes, or result in zero line evictions. But using different transformation functions on overlapping indexes within a shared memory cache will tend to produce fewer transformed overlapping indexes (and thus line evictions) than would using no transformation functions at all.

In an AMP system according to embodiments, system level cache is shared while most of the main memory is not shared. In such a system, main memory is partitioned for each processor, such that each processor has its own dedicated main memory space. But a portion of main memory space in an AMP system according to embodiments is shared amongst the processors (such as for the purpose of shared I/O systems). When shared memory data from the main memory are allocated to the system level cache, the transformation of the indexes associated with the shared memory space will be bypassed, and the cache lines for shared memory data will be allocated according to the un-transformed indexes. In alternate embodiments, shared memory transactions will have their own unique transformation function, and cache lines for shared memory data will be allocated according to transformed indexes that have been transformed according to the unique transformation function for shared memory.

To accommodate the transformation functions, each cache operation will be accompanied not only by an index, datum, and tag but also by an indicator indicating whether the datum is from shared memory and an indication of the processor to which the cache operation belongs. Likewise, system level cache according to embodiments is constructed to include stored indicators to show whether the cache entries are shared, and to which processor the cache entries belong.

Various transformation functions are used in various embodiments. For example, various mathematical operations are performed on the indexes, such as multiplication, division, addition, subtraction, and so forth. In embodiments, the transformation is a circular shift operation. There is no requirement that all transformation functions be the same type of function. For example, a first transformation function in use in a system could include a circular shift operation, and a second transformation function in use in the system could include a multiplication operation. In embodiments, transformation functions combine one or more operations, such as a circular shift operation and an addition, subtraction, multiplication, or division operation, and so forth. Embodiments are not intended to be limited to any one type of types of transformation functions.

The transformation functions for a given computing system are chosen so that different ones of the transformation functions tend to result in different transformed indexes when presented with the same indexes as input to the functions. For example, a first transformation function associated with a first processor will produce a first transformed index when an original index is input into the first transformation function. A second transformation function associated with a second processor will produce a second transformed index when the same original index (but associated with a different physical memory address) is input into the second transformation function. The first transformed index and the second transformed index will be different. Without index transformation in accordance with embodiments of the present disclosure, cache entries associated with these original indexes would conflict and possibly cause a line eviction. By spreading cache entries throughout the cache by transforming indexes using processor-specific transformation functions, the likelihood of conflicts and line evictions is reduced.

Transformation functions according to embodiments are bijective functions. The term "bijective function" as used herein means a function $f(x)=y$ where for every x there is only one y, and vice versa. Transformation functions according to embodiments are reproducible and reversible. Reproducible means that an original index that is input into a transformation function results in the same transformed index each time the transformation is run. Reversible means that when transformed indexes are run through a reverse (or inverse) of the transformation function, it results in the original indexes. In other words, when a reverse transformation function is run on the transformed index, the original index is reproduced. The reverse functions are also reproducible.

Transformation functions according to other embodiments need not be bijective, reversible, and/or reproducible in every case. It is sufficient that a transformation function behave like a reversible and reproducible bijective function for all inputs defined as the range of all possible indexes in the shared system level memory cache. This is because a transformation function that is not a reversible and reproducible bijective function, but that nevertheless behaves like one for inputs defined by the range of possible indexes in the shared system level memory cache, will result in transformed indexes that are uniquely reversible over the range of possible indexes in the shared system level memory cache. Thus, such non-bijective, non-reversible, and non-reproducible transformation functions can be used in accordance with embodiments of the present disclosure. Transformation functions are, according to some embodiments, a permutation function.

FIG. 1 schematically illustrates a block diagram of a transformation logic module having a transformation function module according to embodiments of the present disclosure. Transformation circuit 100 includes an interconnect interface 101 configured to be communicatively coupled to one or more processors, such as through an interconnect network. Transformation circuit 100 also includes a cache interface 103 configured to be communicatively coupled to a cache, such as a system level cache. Transformation function module 105 is communicatively coupled to the interconnect interface 101 and to the cache interface 103. Interconnect interface 101, cache interface 103, and transformation module 105 are according to various embodiments of the present disclosure variously combined as a combinatorial or sequential logic circuit, and/or other suitable components that provide the described functionality. Such components comprises or are included in an Application Specific Integrated Circuit (ASIC), processor (shared, dedicated, or group), Field Programmable Gate Array (FPGA) or other configurable or reconfigurable circuit to perform the described functionality.

Transformation function module 105 is configured to receive, via interconnect interface 101, an index associated with a cache operation that is associated with a processor. The index is a portion of the memory address from a physical memory location of a main memory and is used in embodiments as input to transformation function module 105 to result in transformed indexes. These indexes are received as part of the data that accompanies the cache operation. Such data is received from one or more of the processors, the main memory, an input/output (I/O) module, or the interconnect network, or some other component. Transformation function module 105 is configured to transform the received index using a transformation function, such as a bijective function, associated with the processor that is associated with the cache operation to generate a transformed index. Transformation function module 105 is configured to forward the transformed index to the cache via the cache interface 103 to perform the cache operation on a cache line associated with the transformed index. Such cache operations include look-up operations, maintenance operations (such as a write operation associated with modifying the datum stored in the cache line), line allocation operations, and so forth.

Where the system level cache is shared by multiple processors, in accordance with an embodiment of the disclosure, transformation function module 105 is configured to transform cache operation indexes according to transformation functions that are unique, or reserved, for particular processors. In some embodiments, indexes associated with cache transactions that are associated with some but not all processors have their indexes transformed. In some embodiments, indexes associated with cache transactions that are associated with a group of one or more processors have their indexes transformed according to a first transformation function, and indexes associated with cache transactions that are associated with another group of one or more processors have their indexes transformed according to a second transformation function. In other embodiments, each processor in the system has a unique transformation function associated with it.

Thus, in an embodiment, transformation function module 105 is further configured to receive, via interconnect interface 101, another index associated with another cache operation associated with another processor and to transform the other index using another (and different) transformation function associated with the other processor to generate another transformed index. Transformation function module 105 would then forward the other transformed index to the cache to perform the other cache operation on another cache line associated with the other transformed index.

Various transformation functions, such as bijective functions, are used in embodiments. For example, various mathematical operations are performed on the indexes, such as multiplication, division, addition, subtraction, and so forth. A first transformation function, for example, is a function that multiplies the index by a certain number, and a second transformation function is a function that multiplies the index by a different number. Or in another example, the transformation is a circular shift operation. For example, a first transformation function could include round shifting bits of the index by N bits to either the left or right, and a second transformation function could include round shifting bits of the other index by M bits (either to the left or to the right). There is no requirement that all transformation functions be the same type of function. For example, a first transformation function in use in a system could include a circular shift operation, and a second transformation function in use in the system could include a multiplication operation. Transformation functions according to embodiments combine one or more operations, such as a circular shift operation and an addition, subtraction, multiplication, or division operation, and so forth. Embodiments are not intended to be limited to any one type of types of transformation functions. The transformation functions are chosen in accordance with embodiments so that each transformation function tends to result in different transformed indexes when presented with the same indexes as input. Such transformation functions may also be selected such that lines are allocated to non-contiguous or semi-non-contiguous portions of the memory cache. Such transformation functions may also be selected such that allocated lines are spread throughout the cache, and are not within a localized area of the cache. In embodiments, transformation functions are selected such that they tend to transform overlapping indexes associated with a first processor and a second processor to non-overlapping transformed indexes. In further embodiments, the transformation functions are selected such that the non-overlapping transformed indexes comprise a plurality of non-contiguous indexes.

Transformation function module 105 is configured to perform index transformations in conjunction with cache operations such as look-up operations, line allocations, and line maintenance operations. Transformation function module 105 is also configured to perform reverse index transformations in conjunction with line evictions. Transformation function module 105 is configured to receive from the memory cache a transformed index associated with a line eviction of a cache line. This may occur, for example, where a cache miss has caused a new line to be allocated within the cache, and where doing so has caused a previous entry in the newly allocated cache line to be evicted. Transformation function module 105 is configured to then perform, on the transformed index associated with the line eviction, an inverse of the transformation function that is associated with a processor that the evicted line entry belongs to. Transformation function module 105 is configured to forward the line eviction and the original index to the other processor, main memory, or other device as appropriate.

As noted above, some portions of the main memory are shared amongst the one or more processors. To handle shared main memory cache transactions, transformation function module 105 is further configured to bypass a transformation of an index upon a determination that the other cache operation is associated with shared memory space of the main memory (such as by determining that the shared bit in the data accompanying the cache operation indicates that the operation is associated with shared memory). Transformation function module 105 forwards the un-transformed index to the memory cache to perform the shared memory cache operation on a cache line associated with the un-transformed index. Thus, the memory cache includes cache lines that have been allocated according to both transformed and un-transformed indexes. In other embodiments, transformation function module 105 transforms indexes associated with shared memory cache operations using a transformation function specific for shared memory space.

Figure 2:
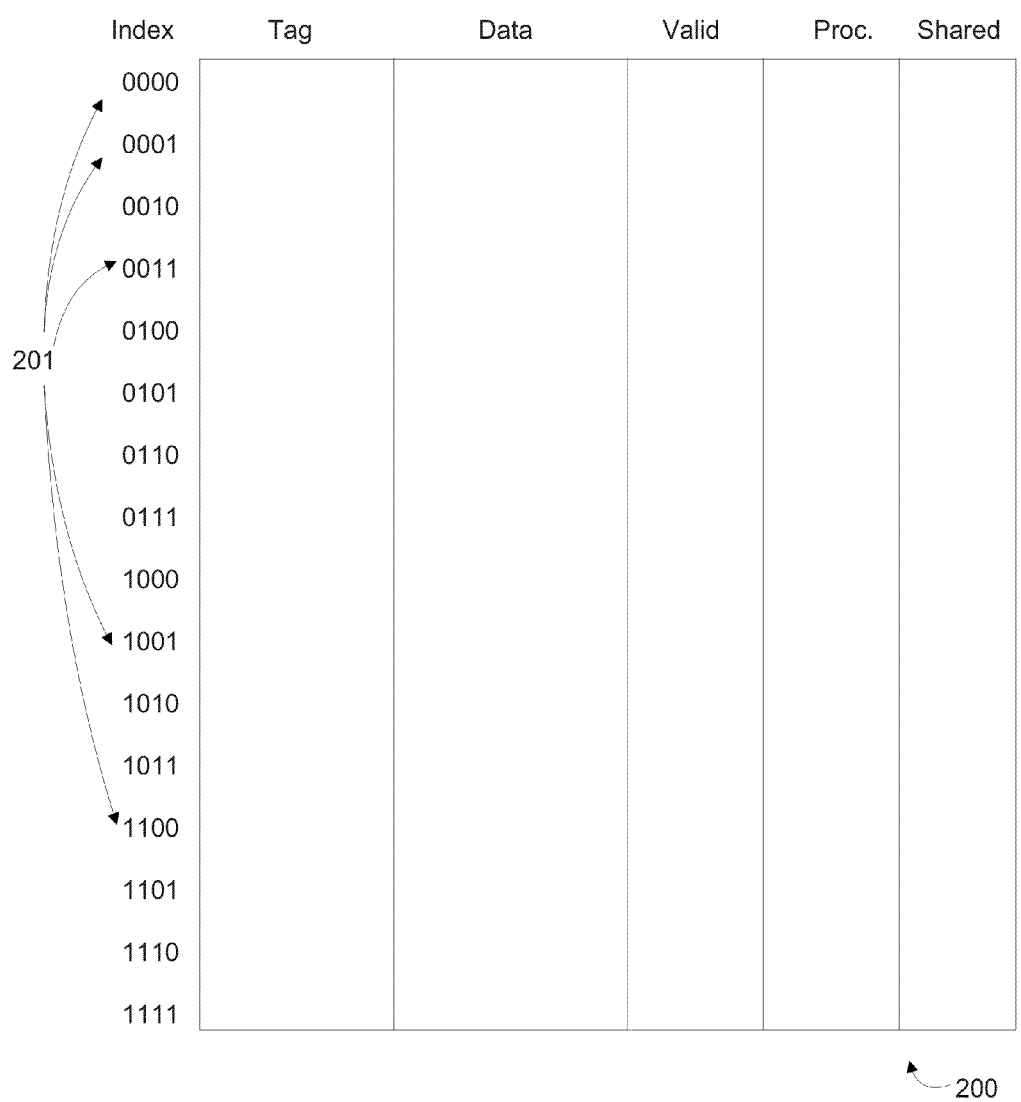
FIG. 2 schematically illustrates a diagram of a memory cache according to embodiments of the present disclosure.

FIG. 2 schematically illustrates a diagram of a memory cache according to embodiments of the present disclosure. Cache memory 200 includes cache lines 201, each identified according to an index. It is noted that cache memories according to embodiments can be larger or smaller, and have fewer or more cache lines 201, than is seen in FIG. 2. In an embodiment, cache lines 201 include bits for storing data, bits for storing tags associated with the data (such as physical memory addresses, virtual memory addresses, or portions of physical or virtual memory addresses), a valid bit to indicate whether the data is currently valid, processor bits to identify a processor to which the cache entry currently belongs, and a shared bit to indicate whether the cache entry is associated with a shared memory space of main memory or if the cache entry is associated with a memory space dedicated to only one of the processors. Storing the processor bits and the shared bits allows, for example, transformation logic (not shown) to determine what transformation function, if any, to use to reversibly transform the indexes in conjunction with line evictions.

Figure 3:
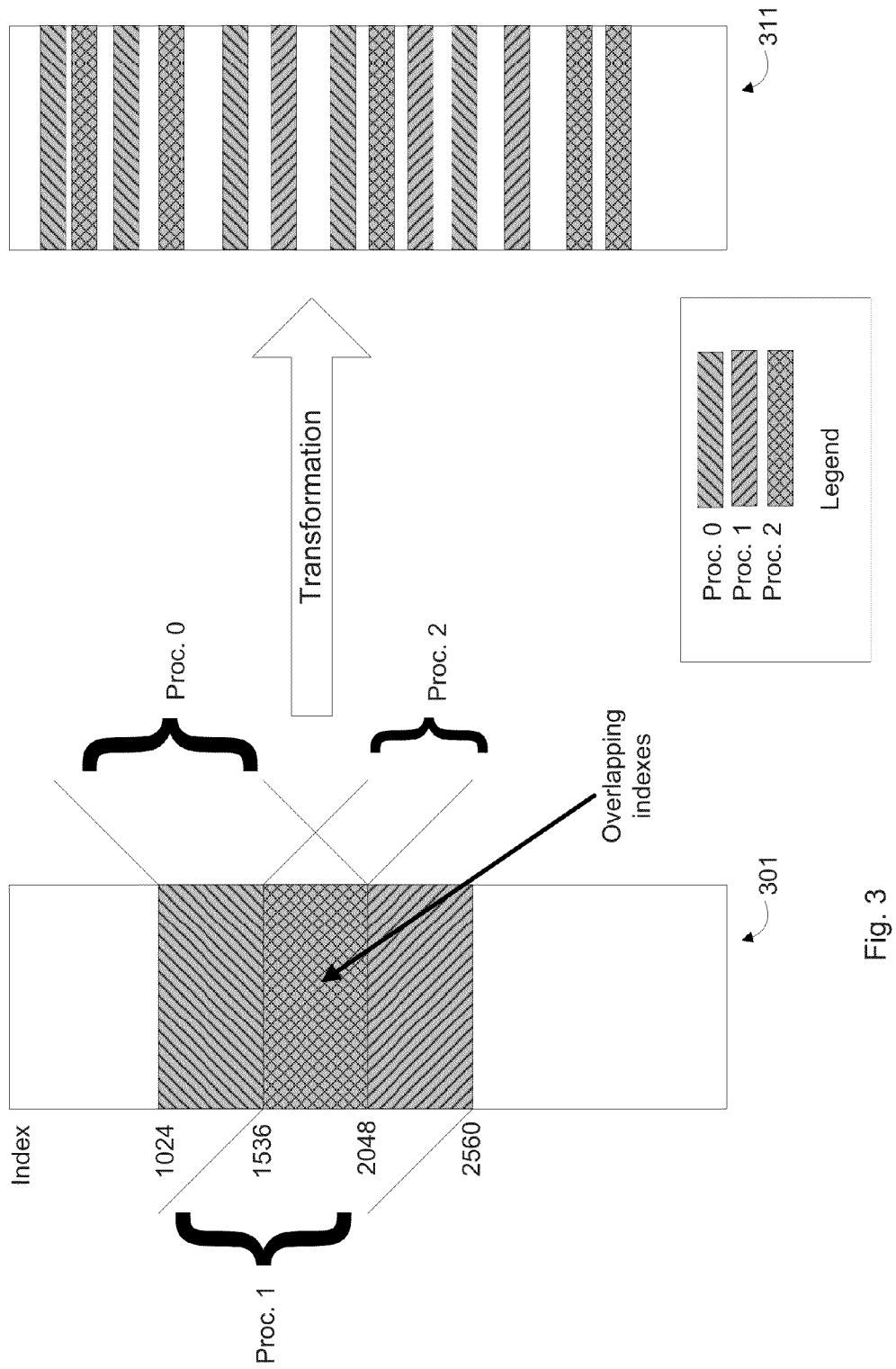
FIG. 3 schematically illustrates a transformation of transaction indexes using transformation functions that are unique to processors associated with those transaction indexes according to embodiments of the present disclosure.

FIG. 3 schematically illustrates a transformation of transaction indexes using transformation functions that are unique to processors associated with those transaction indexes, in accordance with embodiments of the present disclosure. In non-colored index 301, the cache line allocations for processor 0 are within a contiguous range of cache lines from index 1024 to 2048 (though the cache line allocations themselves are not necessarily contiguous). These line allocations are within a contiguous range due to the fact that memory transactions for processor 0 are characterized in locality. Because processor 0 tends to initiate memory transactions to main memory locations that are close in proximity to one another, the resulting indexes for the resulting cache entries will tend to be clustered within a contiguous range of indexes.

Also in non-colored index 301, the cache line allocations for processor 1 are within a contiguous range from index 1536 to 2560, and the cache line allocations for processor 2 are within a contiguous range from index 1536 to 2048. As with processor 0, this might be because processors 1 and 2 tend to initiate memory transactions to main memory locations that are close in proximity to one another (that is, their transactions are also characterized in locality). As shown in non-colored index 301, processors 0, 1, and 2 have cache line allocation ranges that overlap. It is possible that, unlike in the example shown in FIG. 3, that there could be no or little overlap in an un-colored index. But in a shared system level memory cache where individual processor memory transactions are characterized in locality, there exists a non-trivial probability that cache entry index ranges for two or more processors will overlap. In the cache line allocation example shown in non-colored index 301, cache operations associated with the processors are likely to interfere with one another due to their overlapping index ranges. This results in line evictions and reduced system performance.

In the right-hand portion of FIG. 3 is shown colored index 311. Here the indexes for cache transactions have been transformed by transformation functions unique to each of the processors. Thus, the cache entries are allocated to cache lines according to transformed indexes. In the example shown in FIG. 3, cache lines that are allocated according to the transformed indexes are spread over various non-overlapping portions of the cache. The overlapping portions of the contiguous ranges shown in non-colored index 301 are transformed into different portions of colored index 311. This is because the transformation functions for each processor are unique. And because the cache line entries do not tend to overlap in colored index 311, system performance is improved by reducing or eliminating the conflict misses that cause line evictions. It is possible, even with transformation of the indexes using transformation functions that are unique to the various processors, that some overlap will occur in a colored index. But such overlap occurs less frequently in a colored index than in a non-colored index. It is noted that cache entries from the same processor sometimes conflict with each other and cause cache misses and line evictions. Transforming indexes in some circumstances reduce the likelihood of same-processor cache conflicts and evictions.

Figure 4:
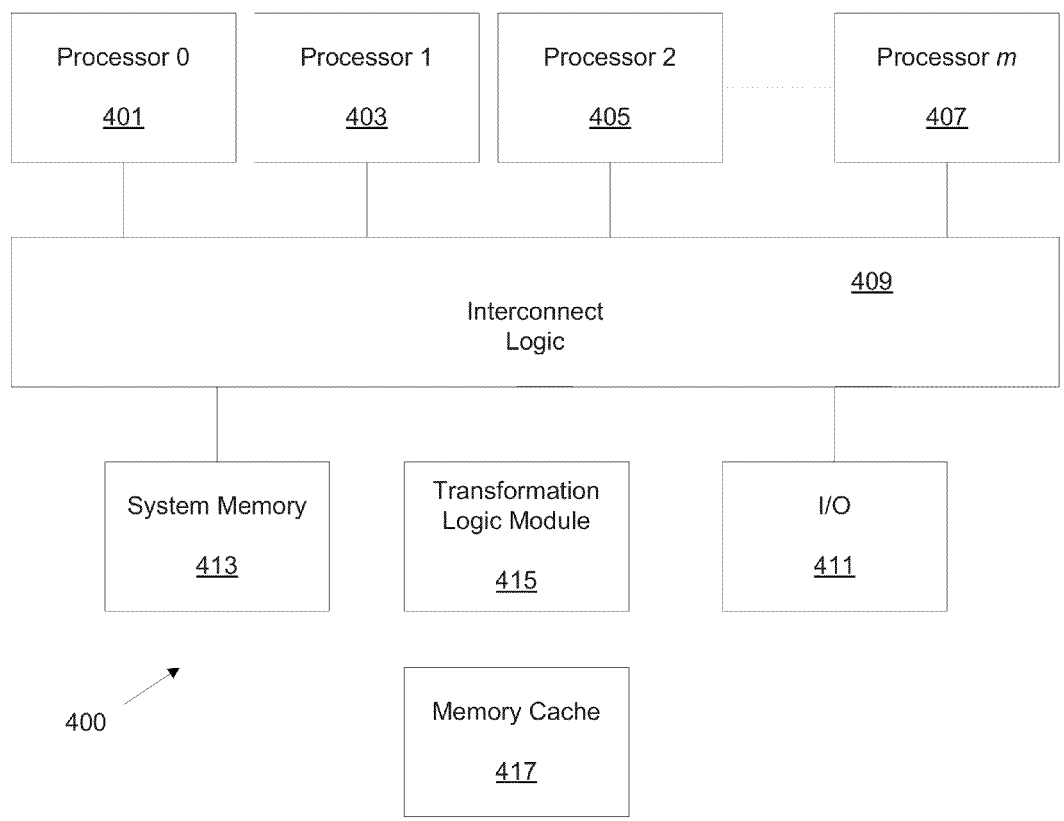
FIG. 4 schematically illustrates a block diagram of a computing system having a memory cache and a transformation function module according to embodiments of the present disclosure.

FIG. 4 schematically illustrates a block diagram of a computing system having a memory cache and a transformation function module according to embodiments of the present disclosure. Computing system 400 includes m plurality of processors 401-407 connected by interconnect logic 409. Interconnect logic 409 is configured to manage transactions between processors 401-407, manage transactions to and from input/output (I/O) 411, manage transactions to and from system memory 413, and manage transactions to and from transformation logic module 415 and memory cache 417. Memory cache 417 includes a plurality of cache lines. It is noted that transformation logic module 415 is, according to embodiments of the present disclosure, a discrete circuit or component within computing system 400. In other embodiments, transformation logic module 415 is a component or feature within interconnect logic 409. In still other embodiments, transformation logic is a component or feature of memory cache 417.

Transformation logic module 415 is configured to receive indexes associated with cache operations, transform individual ones of the indexes using transformation functions, such as bijective functions, that are unique to respective ones of the plurality of processors 401-407, and forward the transformed individual ones of the indexes to memory cache 417. Transformation logic module 415 is configured to transform the received indexes using processor-specific transformation functions that are unique to respective ones of the plurality of processors. In embodiments, the processor-specific transformation functions tend to cause overlapping ranges of indexes associated with memory transactions of the different processors to become transformed indexes that do not conflict (because, for example, they are not in contiguous overlapping ranges). In embodiments, transformation logic module 415 is configured to transform original indexes such that transformed ones of indexes within the two or more overlapping contiguous ranges of indexes become non-contiguous transformed indexes. In embodiments, such transformed ones of indexes within the two or more overlapping ranges of contiguous indexes are located in disparate portions of the memory cache. Thus, in embodiments, the transformed indexes are spread throughout the memory cache. Memory cache 417 is configured to perform the cache operations on those cache lines associated with the transformed individual ones of the indexes.

Cache lines within memory cache 417 are configured to store one or more identifiers that identify which of processors 401-407 are associated with data stored in the individual cache lines. Cache lines also store shared bits (indicators) that indicate whether the cache lines are shared by two or more of processors 401-407. The plurality of processors 401-407 are configured to process data which is indicated as being shared with others of the plurality of processors.

Transformation logic module 415 is configured to perform index transformations when receiving cache operations, such as line allocations, maintenance, or look-ups. Transformation logic module 415 is also configured to receive from memory cache 417 transformed indexes associated with line evictions. In such cases, transformation logic module 415 performs inverses of the transformation functions on the transformed indexes to generate original indexes. These original indexes correspond to portions of memory addresses, such as physical memory addresses within system memory 413. As part of the line eviction process, transformation logic module 415 forwards the line evictions and the un-transformed (un-colored)

original indexes to those of processors 401-407 that are associated with the respective line evictions (or to other components within computing system 400 as appropriate).

Although most portions of system memory 413 are not shared between processors 401-407, some portion of system memory 413 is shared. Transformation logic module 415 will treat indexes associated with cache operations involving shared portions of system memory 413 differently than other cache operations. Transformation logic module 415 is configured to receive indexes associated with shared memory cache operations and bypass transformations of such indexes upon a determination that such cache operations are associated with the shared memory space. Such a determination is made, for example, by determining whether the shared bit is set in the cache operation data that accompanies the index.

Transformation logic module 415 forwards the un-transformed indexes associated with cache operations involving shared memory space to memory cache 417 to perform the shared memory cache operations using the un-transformed indexes. As noted above, various transformation functions are used. Example transformation functions include round shifting bits of the indexes by a number of bits unique to respective ones of processors 401-407. Other example transformation functions include mathematical operations such as multiplication, division, subtraction, or addition, or some combination of these and/or other operations.

Figure 5:
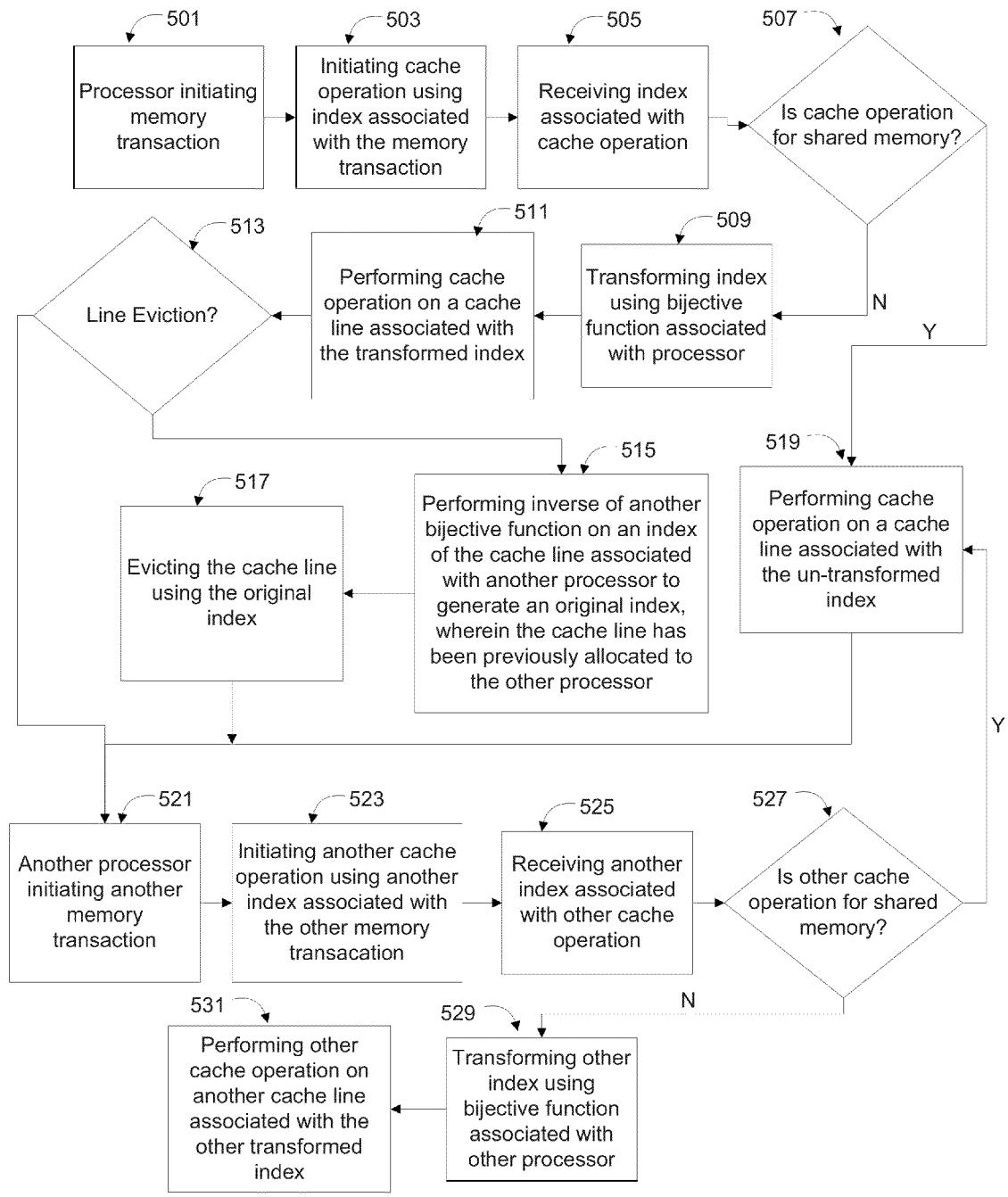
FIG. 5 is a flow chart illustrating memory operations and cache transaction operations that involve transformation functions according to embodiments of the present disclosure.

FIG. 5 is a flow chart illustrating memory operations and cache transaction operations that involve transformation functions according to embodiments of the present disclosure. The order of operations seen in FIG. 5 is not meant to imply that the operations must be performed in the order shown therein. Also, FIG. 5 is not meant to imply that all operations shown therein must be performed. A processor, which is in embodiments one of many processors, initiates a memory transaction, block 501. The memory transaction is for example a read or a write operation. As part of the memory transaction the processor, or some other component such as an interconnect network, initiates a cache operation using an index associated with the memory transaction, block 503. The cache operation is a look-up, a maintenance operation, a line allocation, or other operation. The index is taken from a portion of a memory address of the memory location that the processor is attempting to transact with.

A transformation logic module, which is in embodiments a stand-alone or discrete component or part of the interconnect network or a cache memory, receives the index associated with the cache operation, block 505. The transformation logic module determines whether the cache operation is for shared memory space of the main memory, block 507. If the cache operation is not for a shared memory space, the transformation logic module transforms the index using a transformation function, such as a bijective function, associated with the processor to generate a transformed index, block 509. The transformation logic module then forwards the transformed index to the cache which performs the cache operation on a cache line associated with the transformed index, block 511.

Cache operations using transformed indexes sometimes involve line evictions. A determination is made as to whether the current cache operation involves a line eviction, block 513. If the current cache operation does involve a line eviction, the cache forwards the line eviction to the transformation logic module, which receives the line eviction and the index associated with the line eviction. It is noted that the received index associated with the line eviction is the same as the transformed index that caused the line eviction in the first place. But the transformation logic module performs an inverse of a different transformation function associated with the processor to which the evicted cache entry is associated with to generate an original index, block 515. The original index will likely be different than the index that was transformed in block 509, because the original index was previously derived using a different transformation function (because it is associated with a different processor). The transformation logic module evicts the cache line using the original index, block 517.

If the cache operation is determined to be for shared memory within the main memory in block 507, then the transformation logic module will bypass a transformation of the other index upon a determination that the other cache operation is associated with shared memory space of main memory and perform the other cache operation on the cache line associated with the un-transformed index, block 519. In an alternative embodiment, the transformation logic module will perform a transformation on the other index using a transformation function associated with shared memory. If the cache operation is for a shared memory space, embodiments also include associating (by for example a processor, the interconnect network, a transformation logic module, or other component) a cache operation with an indicator that the cache operation is associated with a shared portion of main memory, transforming by the transformation module an index associated with the cache operation using a transformation function associated with shared memory, and performing by the cache memory the cache operation on a cache line associated with the transformed index, including storing the indicator in the cache line.

The transformation logic module uses unique transformation functions for transforming indexes associated with cache operations for each individual processor in the system, or alternatively for groups of one or more processors in the system. Another processor initiates another memory transaction, block 521. The other memory transaction is a read or a write operation. As part of the other memory transaction the other processor, or some other component such as an interconnect network, initiates a cache operation using an index associated with the memory transaction, block 523. The other cache operation is a look-up, a maintenance operation, or a line allocation. The other index is a portion of another memory address of the memory location that the other processor is attempting to transact with.

The transformation logic module receives the other index associated with the cache operation associated with the other processor, block 525. The transformation logic module determines whether the other cache operation is for shared memory space of the main memory, block 527. If the other cache operation is not for a shared memory space, the transformation logic module transforms the other index using another transformation function associated with the other processor to generate another transformed index, block 529. The transformation logic module then forwards the other transformed index to the cache which performs the other cache operation on another cache line associated with the other transformed index, block 531. Though it is not seen in FIG. 5, a determination is also made after block 531 as to whether the other cache operation includes a line eviction, and a process similar to the process depicted in blocks 513, 515, and 517 is performed.

The transformation functions include various operations, or combinations of operations such as round shifting bits of the indexes, multiplying, dividing, adding, or subtracting from the indexes.

Although specific embodiments have been illustrated and described herein, a wide variety of alternate and/or equivalent implementations are substituted for the specific embodiments shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. An apparatus, comprising:
 a memory cache configured to be shared by a plurality of processors; and
 a transformation function module coupled to the memory cache, and configured to transform an index associated with a cache operation associated with a processor of the plurality of processors using a transformation function associated with less than all of the plurality of processors to generate a transformed index.

2. The apparatus of claim 1, wherein the processor is a first processor of the plurality of processors, and wherein the transformation function module is further configured to transform another index associated with another cache operation associated with a second processor of the plurality of processors using another transformation function associated with the second processor to generate another transformed index.

3. The apparatus of claim 2, wherein the transformation function includes round shifting bits of the index by N bits, and wherein the other transformation function includes round shifting bits of the other index by M bits, where M and N are integers.

4. The apparatus of claim 2, wherein the transformation function and the other transformation function are selected such that they tend to transform overlapping indexes associated with the first processor and the second processor to non-overlapping transformed indexes.

5. The apparatus of claim 4, wherein the overlapping indexes are within a contiguous range of indexes, and wherein the non-overlapping transformed indexes comprise a plurality of non-contiguous indexes.

6. The apparatus of claim 1, wherein the processor is a first processor of the plurality of processors, and wherein the transformation function module is further configured to perform, on the transformed index associated with a line eviction, an inverse of another transformation function associated with a second processor of the plurality of processors to generate an original index associated with the second processor.

7. The apparatus of claim 1, wherein the cache operation comprises a look-up operation, a line allocation, or a line maintenance operation of the cache line.

8. The apparatus of claim 1, wherein the processor is a first processor of a plurality of processors, and wherein the transformation function module is further configured to bypass a transformation of another index associated with another cache operation associated with a second processor of the plurality of processors upon a determination that the another cache operation is associated with shared memory space of the main memory.

9. The apparatus of claim 1, wherein the transformation function associated with the processor is reserved for the processor.

10. A system, comprising:
 a plurality of processors;
 a memory cache comprising a plurality of cache lines; and
 transformation logic coupled to the plurality of processors and the memory cache, wherein the transformation logic is configured to transform individual ones of indexes associated with cache operations using processor-specific transformation functions that are unique to respective ones of the plurality of processors, wherein the processor-specific transformation functions tend to cause overlapping ranges of indexes associated with memory transactions of the different processors to be allocated to cache lines in the memory cache that are spread throughout the memory cache.

11. The system of claim 10, wherein the plurality of cache lines are configured to store one or more identifiers that identify processors associated with data stored in the cache lines, and shared bits that indicate whether the data stored in the cache lines are from shared portions of main memory, and wherein the plurality of processors are configured to process data which is indicated as being shared with others of the plurality of processors.

12. The system of claim 10, wherein the transformation logic is further configured to perform inverses of the transformation functions on transformed indexes associated with line evictions to generate original indexes.

13. The system of claim 10, wherein the indexes comprise portions of memory addresses.

14. The system of claim 10, wherein the transformation logic is further configured to bypass transformations of other indexes associated with other cache operations involving shared memory space of main memory.

15. The system of claim 10, wherein the overlapping ranges of indexes comprise contiguous ranges of indexes, and wherein transformed ones of indexes within the two or more overlapping contiguous ranges of indexes are non-contiguous transformed indexes.

16. The system of claim 10, wherein two or more indexes within the overlapping ranges of indexes are contiguous indexes, and wherein transformed ones of indexes within the two or more overlapping ranges of contiguous indexes are located in disparate portions of the memory cache.

17. A method comprising:
 associating a cache operation with an indicator that the cache operation is associated with a shared portion of main memory;
 transforming an index associated with the cache operation using a transformation function specific for cache operations for data stored in the shared portion of main memory; and
 performing the cache operation on a cache line associated with the transformed index, including storing the indicator in the cache line.

18. The method of claim 17, further comprising:
 transforming another index associated with another cache operation associated with the processor using another transformation function associated with the processor to generate another transformed index; and
 performing the another cache operation on another cache line associated with the another transformed index, including storing another indicator that the another cache operation is associated with a non-shared portion of the main memory.

19. The method of claim 17, wherein the transformation function includes round shifting bits of the index by N bits, wherein the another transformation function includes round shifting bits of the other index by M bits, where M and N are integers.

20. The method of claim 17, wherein the method further comprises a line eviction on the cache line associated with the transformed index, wherein the line eviction includes:

performing, on the transformed index, an inverse of the transformation function associated with shared memory to generate an original index; and evicting the cache line using the original index.

* * * * *